US011340087B2

(12) United States Patent
Li et al.

(10) Patent No.: US 11,340,087 B2
(45) Date of Patent: May 24, 2022

(54) METHOD AND APPARATUS FOR SMARTLY MANAGING A PLURALITY OF POTENTIAL TRAVEL DESTINATIONS OF A USER

(71) Applicant: Bayerische Motoren Werke Aktiengesellschaft, Munich (DE)

(72) Inventors: Qing Li, Chicago, IL (US); Jilei Tian, Chicago, IL (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 200 days.

(21) Appl. No.: 16/806,425

(22) Filed: Mar. 2, 2020

(65) Prior Publication Data

US 2020/0200557 A1 Jun. 25, 2020

Related U.S. Application Data

(63) Continuation of application No. PCT/EP2017/078867, filed on Nov. 10, 2017.

(51) Int. Cl.
*G01C 21/34* (2006.01)
*G01C 21/36* (2006.01)

(52) U.S. Cl.
CPC ..... *G01C 21/3484* (2013.01); *G01C 21/3476* (2013.01); *G01C 21/3682* (2013.01)

(58) Field of Classification Search
CPC ............ G01C 21/3484; G01C 21/3476; G01C 21/3682; G01C 21/3614; G01C 21/3617
See application file for complete search history.

(56) References Cited

U.S. PATENT DOCUMENTS

2011/0282571 A1 11/2011 Krumm et al.
2015/0134244 A1 5/2015 Hershey et al.
2019/0101408 A1* 4/2019 Deguchi ............ G01C 21/3679

OTHER PUBLICATIONS

International Search Report (PCT/ISA/210) issued in PCT Application No. PCT/EP2017/078867 dated Jan. 8, 2018 (four (4) pages).
Written Opinion (PCT/ISA/237) issued in PCT Application No. PCT/EP2017/078867 dated Jan. 8, 2018 (10 pages).

* cited by examiner

*Primary Examiner* — Rami Khatib
(74) *Attorney, Agent, or Firm* — Crowell & Moring LLP

(57) ABSTRACT

A method for smartly managing a plurality of potential travel destinations of a user is provided. The method includes determining a plurality of similarities between different pairs of the plurality of potential travel destinations. Further, the method includes weighting the plurality of similarities using contextual information related to the user, and clustering part of the plurality of potential travel destinations based on the plurality of weighted similarities.

18 Claims, 9 Drawing Sheets

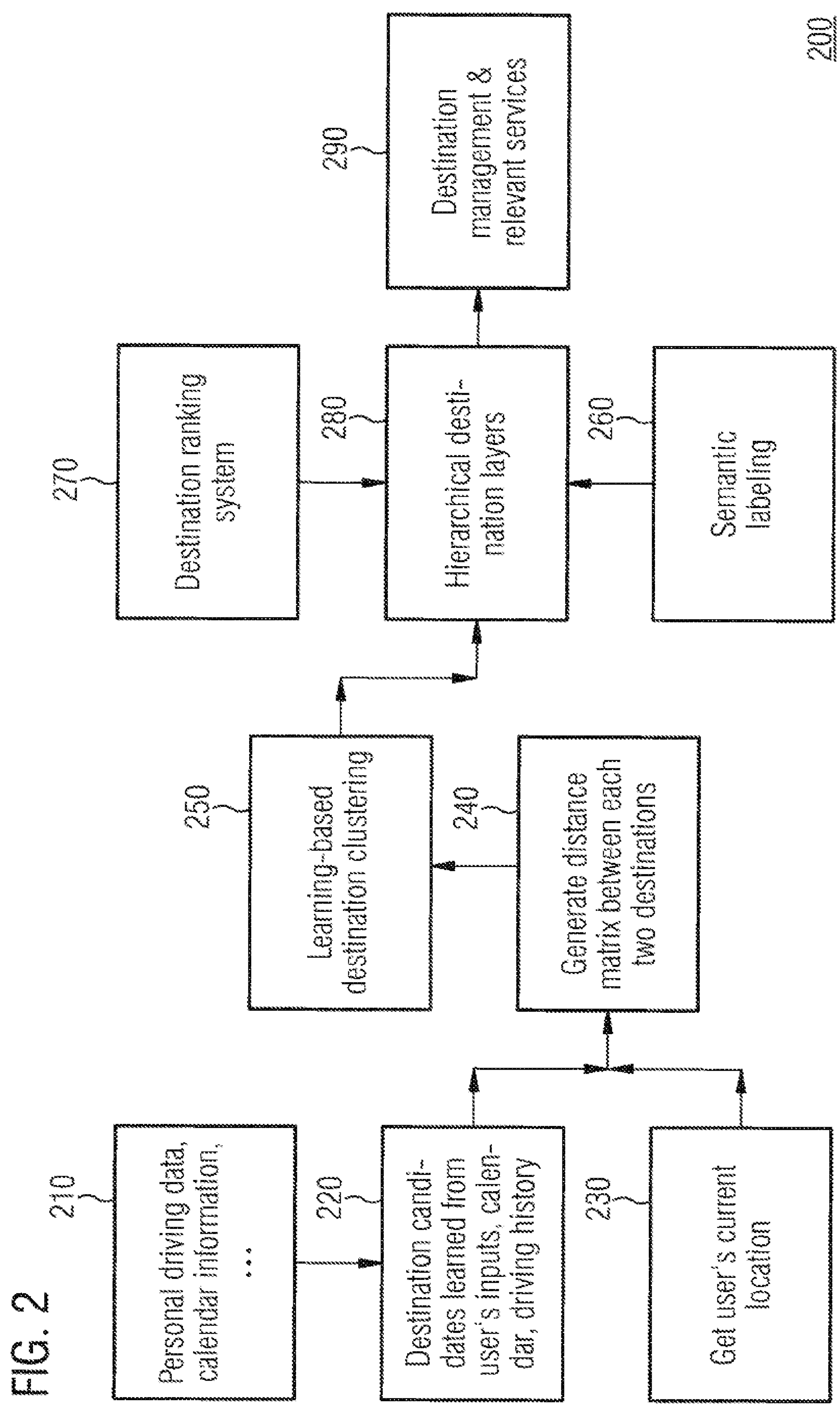
FIG. 2
200
210
Personal driving data, calendar information, ...
220
Destination candi-dates learned from user's inputs, calen-dar, driving history
230
Get user's current location
240
Generate distance matrix between each two destinations
250
Learning-based destination clustering
260
Semantic labeling
270
Destination ranking system
280
Hierarchical desti-nation layers
290
Destination management & relevant services

| FIG. 8A |
| --- |
| FIG. 8B |

METHOD AND APPARATUS FOR SMARTLY MANAGING A PLURALITY OF POTENTIAL TRAVEL DESTINATIONS OF A USER

CROSS REFERENCE TO RELATED APPLICATION

This application is a continuation of PCT International Application No. PCT/EP2017/078867, filed Nov. 10, 2017, the entire disclosure of which is herein expressly incorporated by reference.

BACKGROUND AND SUMMARY OF THE INVENTION

The present disclosure relates to managing potential travel destinations of a user. In particular, examples relate to a method and an apparatus for smartly managing a plurality of potential travel destinations of a user.

With the rapid growth of user's destinations, a driver can easily have more than a hundred destinations which can be a huge contact list or visited locations in the map. Users expect to have a smart destination album which allows the user to effectively manage and find relevant destinations. Many map and car digital service applications display recent destinations or recently searched places for the users and enable users to look up these destinations. However, this approach brings a lot of pains especially when a driver visits another city. For example, the "home"-destination or the "work"-destination will be the top ones during vacation. After the user comes back to his home city, all the vacation related destinations will be kept in the destination list for a very long time. A user usually needs to go through each destination to find the target for quite some time. This may cause an undesired cognitive load for the user, which may distract the user—especially while the user is driving on the road.

Hence, there is a demand for improved management of potential travel destinations of a user to leverage the relevancy.

The demand may be satisfied by examples described herein.

An example relates to a method for smartly managing a plurality of potential travel destinations of a user. The method comprises determining a plurality of similarities between different pairs of the plurality of potential travel destinations. Further, the method comprises weighting the plurality of similarities using contextual information related to the user, and clustering part of the plurality of potential travel destinations based on the plurality of weighted similarities.

Another example relates to a non-transitory machine readable medium having stored thereon a program having a program code for performing the method as described herein, when the program is executed on a processor.

A further example relates to an apparatus for managing a plurality of potential travel destinations of a user. The apparatus comprises a memory configured to store the plurality of potential travel destinations. Further, the apparatus comprises a processor circuit configured to determine a plurality of similarities between different pairs of the plurality of potential travel destinations. The processor circuit is additionally configured to weight the plurality of similarities using contextual information related to the user, and cluster part of the plurality of potential travel destinations based on the plurality of weighted similarities.

Using the similarities between different pairs of potential travel destinations together with the user related contextual information may allow grouping of the plurality of potential travel destinations in a more user-friendly manner. Accordingly, a cognitive load for finding a certain one of the plurality of potential travel destinations may be reduced. Thus, distraction of the user may be reduced.

Some examples of apparatuses and/or methods will be described in the following by way of example only, and with reference to the accompanying figures.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 illustrates a flowchart of another example of a method for managing a plurality of potential travel destinations of a user.

DETAILED DESCRIPTION OF THE DRAWINGS

Various examples will now be described more fully with reference to the accompanying drawings in which some examples are illustrated. In the figures, the thicknesses of lines, layers and/or regions may be exaggerated for clarity.

While further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

If two elements A and B are combined using an "or", this is to be understood to disclose all possible combinations, i.e. only A, only B as well as A and B. An alternative wording for the same combinations is "at least one of A and B." The same applies for combinations of more than 2 Elements.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
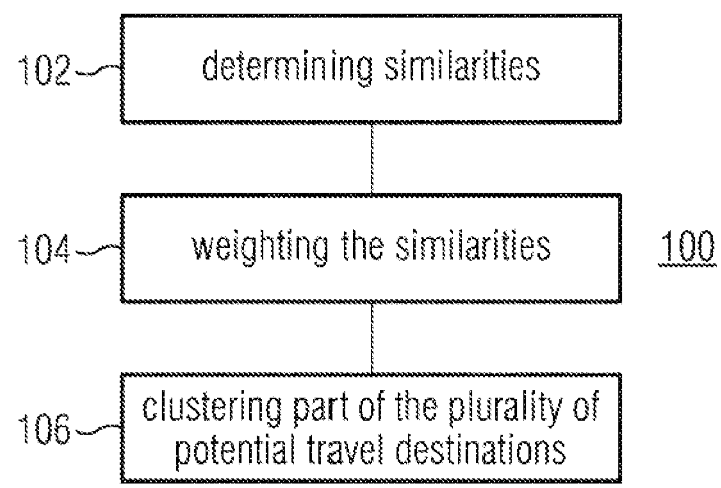
FIG. 1 illustrates a flowchart of an example of a method for managing a plurality of potential travel destinations of a user.

FIG. 1 illustrates a method 100 for managing a plurality of potential travel destinations of a user. For example, the plurality of potential travel destinations may be determined from user generated content. User generated content is any content generated by a user. For example, user generated textual content may be one or more characters or words input by a user via a keyboard, a touch display, a mouse, or any other suitable human-machine-interface. User generated textual content may further be content recognized into textual format (e.g., through speech recognition on user's speech), or textual information extracted from image and video (e.g., by Optical Character Recognition, OCR, etc.). Further, user generated content may be historic driving data (e.g. historic travel destinations) or historic search data (for travel destinations) of the user.

Method 100 comprises determining 102 a plurality of similarities between different pairs of the plurality of potential travel destinations. The similarity between two potential travel destinations of the plurality of potential travel destinations may be determined based on one or more criteria. For example, the similarity between a pair of the plurality of potential travel destinations may be based on a distance between the pair of the plurality of potential travel destinations. Alternatively or additionally, further criteria like similarity of the addresses of the pair of potential travel destination, semantic similarity of the pair of potential travel destination, etc. may be used. If more than one criterion is used for determining the similarity between the pair of potential travel destination, a dedicated metric may be used for weighting the individual criteria.

Further, method 100 comprises weighting 104 the plurality of similarities using contextual information related to the user. Contextual information is any information influencing the likelihood that a user will travel a potential travel destination. For example, the contextual information related to the user may be one of a current location of the user, a (recent and/or historical) visit frequency of the respective pair of the plurality of potential travel destinations (i.e., the user's preference for a potential travel destination), a current time, or a current day of the week. Accordingly, the weighted similarity between the pair of the plurality of potential travel destinations may, e.g., be based on a weighting factor that depends on the current location of the user.

Additionally, method 100 comprises clustering 108 part of the plurality of potential travel destinations based on the plurality of weighted similarities. In other words, some of the plurality of potential travel destinations are grouped together based on the weighted similarities. Accordingly, the plurality of potential travel destinations may be organized in a more user-friendly manner according to their relevance to the user. A cognitive load for finding a certain one of the plurality of potential travel destinations may, hence, be reduced. Further, distraction of the user may be avoided.

For example, clustering 106 part of the plurality of potential travel destinations may comprise not clustering pairs of the plurality of potential travel destinations having a respective weighted similarity within a first range. Further, clustering 106 part of the plurality of potential travel destinations may comprise clustering pairs of the plurality of potential travel destinations having a respective weighted similarity within a second range to a first cluster. The first range may be chosen such that potential travel destinations having a respective weighted similarity within the first range are likely travel destinations for the user. Accordingly, these travel destinations are not clustered. The second range may be chosen such that potential travel destinations having a respective weighted similarity within the second range are less likely travel destinations for the user. Since these travel destinations are of minor interest for the user, they are grouped in the first cluster. Accordingly, a user-friendly grouping of the plurality of potential travel destinations may be achieved. In some examples, third, fourth, or further ranges for the weighted similarities may be used in order to cluster pairs of the plurality of potential travel destinations to second, third, and further clusters.

Method 100 may further comprise displaying, to the user, individual graphic symbols for the pairs of the plurality of potential travel destinations having a respective weighted similarity within the first range, and displaying, to the user, a single graphic symbol for the potential travel destinations in the first cluster. Accordingly, relevant potential travel destinations can be directly presented to the user, whereas less relevant travel destinations are hidden. A cognitive load for finding and selecting a certain travel destination among the plurality of potential travel destinations may, hence, be reduced.

While the basic principles of the proposed concept were described above in connection with FIG. 1, a more detailed example of a method 200 for managing a plurality of potential travel destinations of a user is illustrated in FIG. 2.

In step 210, user generated content is collected. User generated content may, e.g., be personal driving data and calendar information. For example, (all) historic driving data of the user and upcoming calendar events with location information may be collected in step 210.

In step 220, a plurality of potential travel destinations are determined from the user generated content. For example, all the destinations may be automatically learned based on the user's driving history, the user's inputs and/or calendar information.

Further, information about the current location of the user is received (e.g., from a navigation system/application) or determined (e.g., via a Global Navigation Satellite System, GNSS) in step 230.

In step 240, respective similarities between different pairs of the plurality of potential travel destinations are determined and weighted using contextual information related to the user. In the example of FIG. 2, the similarity between a pair of the plurality of potential travel destinations is based on a distance between the pair of the plurality of potential travel destinations, wherein the weighting is based on a weighting factor that depends on a current location of the user. A weighted similarity may, hence, be understood as a calibrated distance metric.

That is, step 240 relates to distance matrix generation, in which a calibrated distance between each two destinations is calculated. Given any two destinations, if two destinations are far from a user's current location, the user will have low probability to go to these destinations.

However, if the two destinations are close to the user's current location, the user will more likely go to these places. Thus, the calibrated distance calDis may be generally defined as:

$$\mathrm{calDis}(d_i, d_j)=f(\mathrm{dis}(d_i, d_j), \mathrm{dis}(o_{i,j}, CL)) \quad (1)$$

with $d_i$, $d_j$ denoting the geographical positions of a pair of potential travel destinations, CL denoting the current location of the user, $o_{i,j}$ denoting a line connecting the pair of the plurality of potential travel destinations, and dis(A, B) denoting the distance between two points A and B. That is, the weighting factor for a respective pair of potential travel destinations depends on a distance of the current location of the user to a line connecting the respective pair of the plurality of potential travel destinations.

Figure 3:
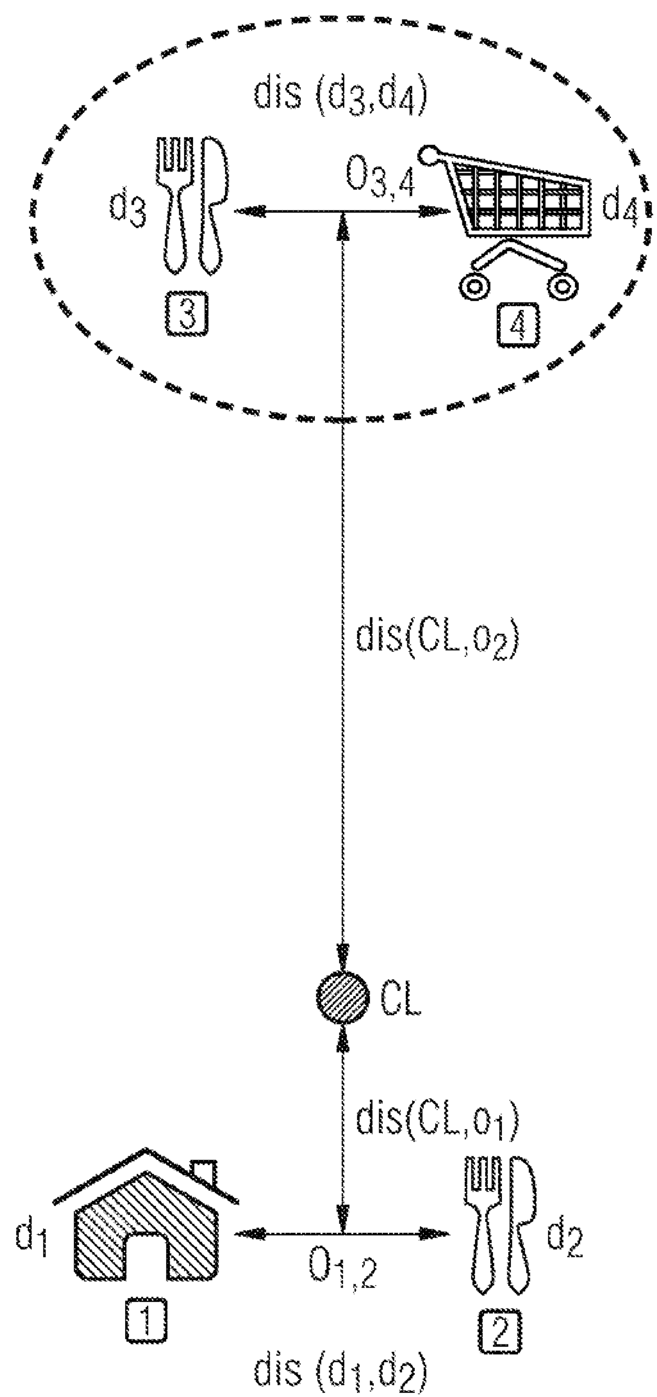
FIG. 3 illustrates an example for determining a weighted similarity.

This is exemplarily illustrated in FIG. 3. Four potential travel destinations 1, 2, 3 and 4 are illustrated in FIG. 3. The user's current location is denoted by CL. The distance dis($d_1$, $d_2$) between potential travel destinations 1 and 2 is about the same as the distance between dis($d_3$, $d_4$) between potential travel destinations 3 and 4. However, the distance dis($o_{1,2}$, CL) between the current location CL of the user to the line $o_{1,2}$ connecting potential travel destinations 1 and 2 is much smaller than the distance dis($o_{3,4}$, CL) between the current location CL of the user to the line $o_{3,4}$ connecting potential travel destinations 3 and 4. It is, hence, much more likely that a user will go to one of potential travel destinations 1 and 2 than to one of potential travel destinations 3 and 4. This is considered by means of the weighting factor that depends on the distance of the current location of the user to the line connecting the respective pair of the plurality of potential travel destinations.

For example, the weighted similarity, i.e., the calibrated distance, may be defined as in the following expression (2):

$$calDis(d_i, d_j) = \begin{cases} \frac{dis(d_i, d_j)}{minNormFactor} & \text{if } dis(o_{i,j}, CL) <= minThre \\ \frac{dis(d_i, d_j)}{midNormFactor(o_{i,j}, CL)} & \text{if } minThre < dis(o_{i,j}, CL) <= maxThre \\ \frac{dis(d_i, d_j)}{maxNormFactor} & \text{if } maxThre < dis(o_{i,j}, CL) \end{cases}$$

It is evident from expression (2) that the weighting factor is a first value minNormFactor if the distance dis($o_{i,j}$, CL) of the current location CL of the user to the line $o_{i,j}$ connecting the respective pair of the plurality of potential travel destinations is smaller than a first threshold minThre.

Further, the weighting factor is a second value midNormFactor($o_{i,j}$, CL) if the first threshold minThre is smaller than the distance dis($o_{i,j}$, CL) of the current location CL of the user to the line connecting the respective pair of the plurality of potential travel destinations.

If a second threshold maxThre is smaller than the distance dis($o_{i,j}$, CL) of the current location CL of the user to the line connecting the respective pair of the plurality of potential travel destinations, the weighting factor is a third value maxNormFactor.

As indicated in expression (2), the second value midNormFactor($o_{i,j}$, CL) may be variable. For example, the second value midNormFactor ($o_{i,j}$, CL) may depend on the distance of the current location CL of the user to the line $o_{i,j}$ connecting the respective pair of the plurality of potential travel destinations. An exemplary dependency is given in below expression (3):

$$midNormFactor(o_{i,j}, CL) = minNormFactor + \frac{dis(o_{i,j}, CL) - minThre}{maxThre - minThre} \times (maxNormFactor - minNormFactor)$$

The first threshold value minThre may be determined adaptively (e.g., using a corresponding algorithm) in order to take into account the distribution of the potential travel destinations of a user. For example, the first threshold value minThre may be determined by considering the user's current location. If most potential travel destinations are (well) distributed within 15 km, the minimum threshold should be about 15 km, so that local frequent travel destinations are not grouped into a cluster. This may allow users to easily find those local travel destinations they regularly commute and visit. For other users, however, potential travel destinations may, e.g., be within 5 km, so that the first threshold value minThre should be about 5 km.

For example, the first threshold value minThre may be selected based on a ratio of the increase of the number of potential travel destinations to the increase of the distance to the current location of the user. This is illustrated in FIGS. 4 and 5, which illustrate exemplary relations between a number of potential travel destinations and a distance to a current location of a user.

Figure 4:
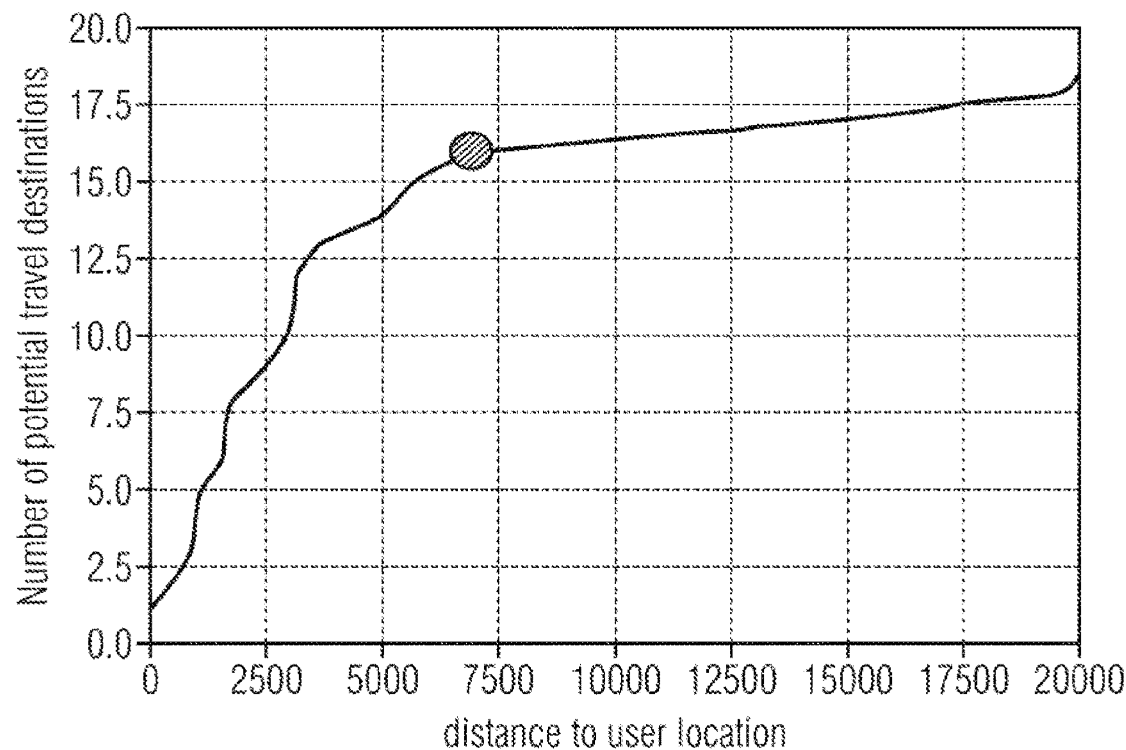
FIGS. 4 and 5 illustrate exemplary relations between a number of potential travel destinations and a distance to a current location of a user.
Figure 5:
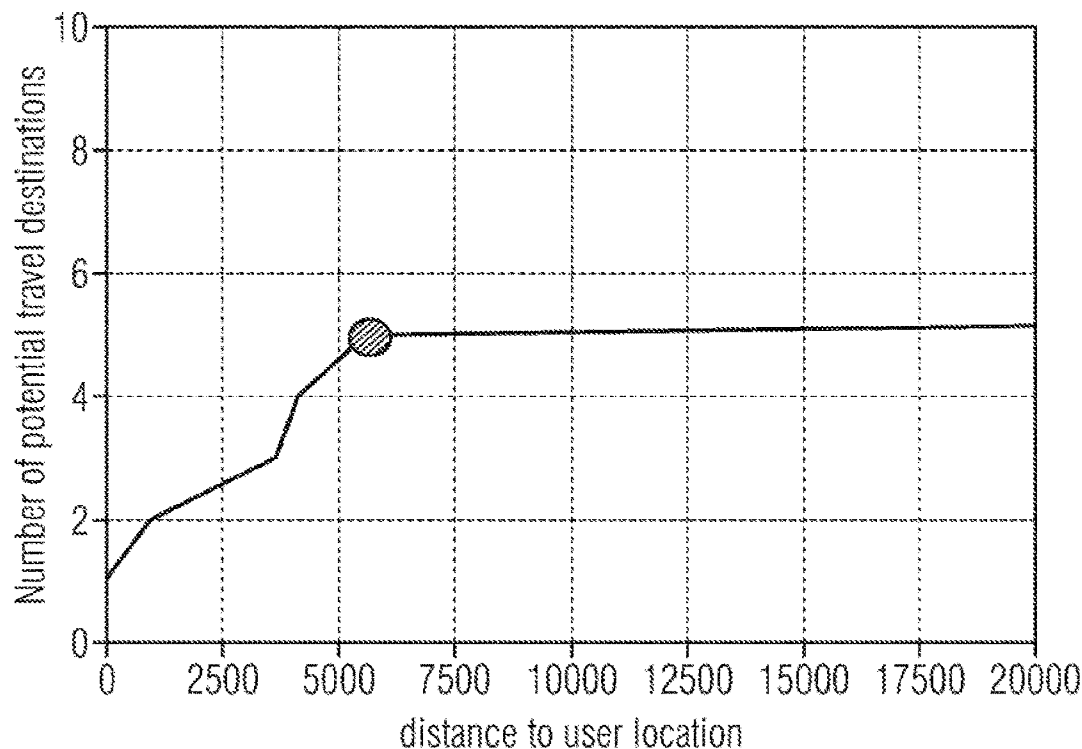

In FIGS. 4 and 5, the slope of the graph may be compared to a predefined value indicating minimum increase of the number of potential travel destinations per distance increase to the current location of the user. For example, an algorithm may check the slope for its change for all given destinations ($Dis_1$, $DesNum_1$, ($Dis_2$, $DesNum_2$), . . . , ($Dis_1$, $DesNum_1$), . . . , ($Dis_n$, $DesNum_n$) where $Dis_i$<maxDisValue for every i.

In FIG. 4, the increase of the number of potential travel destinations per distance increase to the current location of the user is above the predefined value up to a distance of about 7 km (i.e., 7000 m) to the current location of the user. In FIG. 5, the increase of the number of potential travel destinations per distance increase to the current location of the user is above the predefined value up to a distance of about 5.5 km (i.e., 5500 m) to the current location of the user. Accordingly, the first threshold value minThre should be about 7 km for situation illustrated in FIG. 4, and be about 5.5 km for the situation illustrated in FIG. 5.

That is, the first threshold value minThre may be the maximum distance to the current location of the user for which the increase of the number of potential travel destinations is larger than the predefined value.

After determining the weighted similarities in step 240 according to the above principles, the potential travel destinations are clustered in step 250. In particular, the potential travel destinations are clustered based on the plurality of weighted similarities. That is, a learning-based destination clustering is performed in step 250. Based on the distance matrix between each pair of potential travel destinations, an, e.g., unsupervised learning method may be used to cluster these destinations (in some examples an average link clustering algorithm may be used).

As described above, pairs of the plurality of potential travel destinations having a respective calibrated distance (i.e. weighted similarity) within a first range are not clustered. On the other hand, pairs of the plurality of potential travel destinations having a respective weighted similarity within a second range are clustered to a first cluster.

Figure 6:
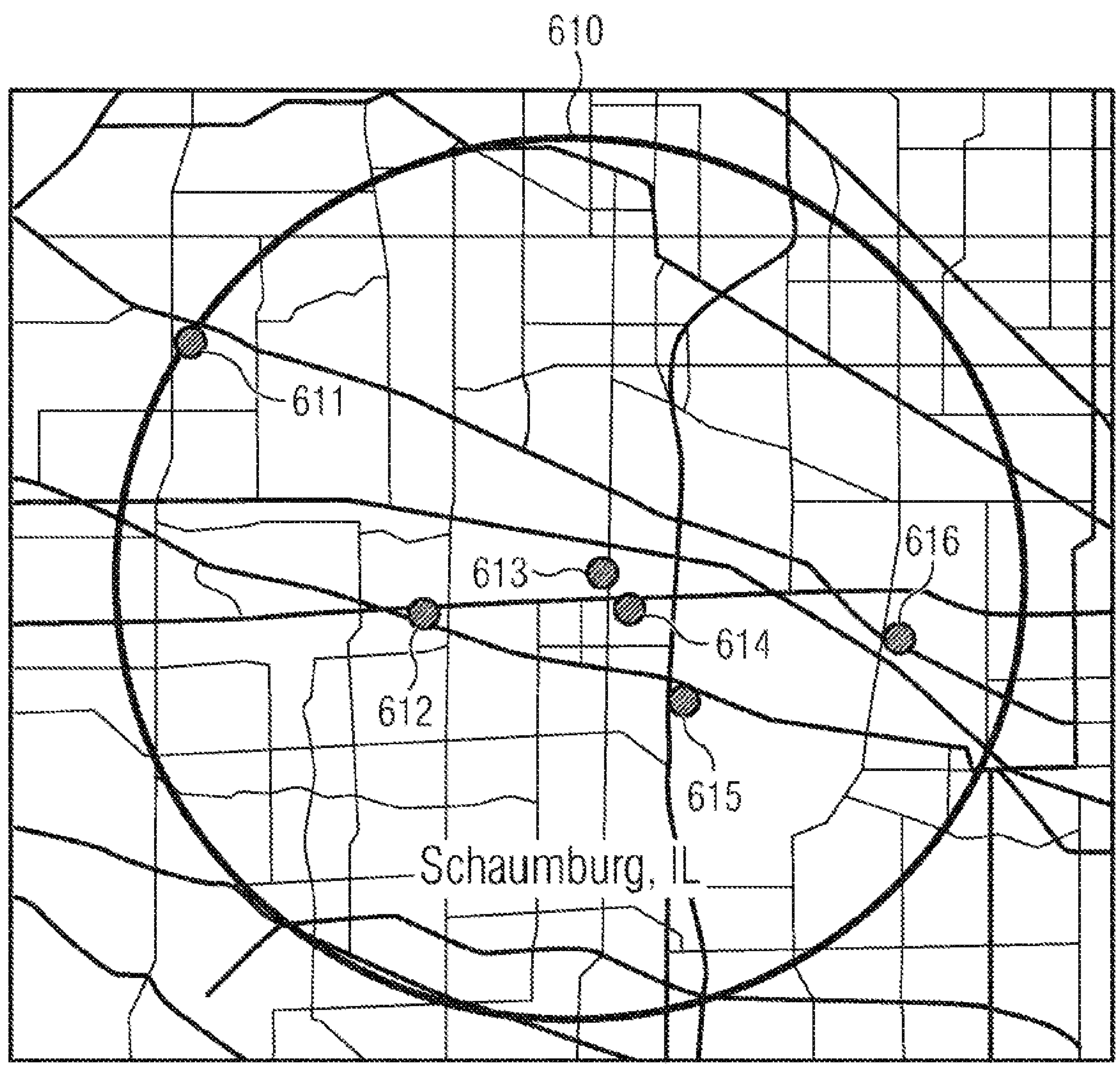
FIG. 6 illustrates an example of a labelled cluster.

An example of a cluster is illustrated in FIG. 6. In FIG. 6, six potential travel destinations 611, 612, . . . , 616 are clustered to a cluster 610. Further, a label is assigned to the first cluster 610 based on the potential travel destinations 611, 612, . . . , 616 in the first cluster 610. Since the six potential travel destinations 611, 612, 616 are all located in Schaumburg, Ill., the label "Schaumburg, Ill." is assigned to cluster 610.

Similarly, each destination may be labelled in order to provide a semantic meaning for each place. This is done in step 260 of method 200. For example, if a cluster contains a single potential travel destination, the Point-Of-Interest (POI) labeling of that destination may be used. If a cluster contains multiple potential travel destination, a meaningful label may be assigned to that cluster (e.g., related to commonality of all the destinations for a given cluster like a back-off to a district or city level).

The different clusters may further be ranked in step 270. For example, if pairs of the plurality of potential travel destinations having a respective calibrated distance (i.e., weighted similarity) within a third range is clustered to a second cluster according to the proposed concept, the first cluster and the second cluster may be ranked based on the potential travel destinations in the first cluster and in the second cluster. For example, method 200 may comprise ranking the first cluster and the second cluster based on one or more attributes of the potential travel destinations in the first cluster and in the second cluster. The destination ranking system of step 270 may, e.g., rank the clusters based on the number of visits of these travel destinations, stay durations at these destinations, distances to the current location, aging, etc. This may facilitate finding the target destination for the user.

Figure 7:
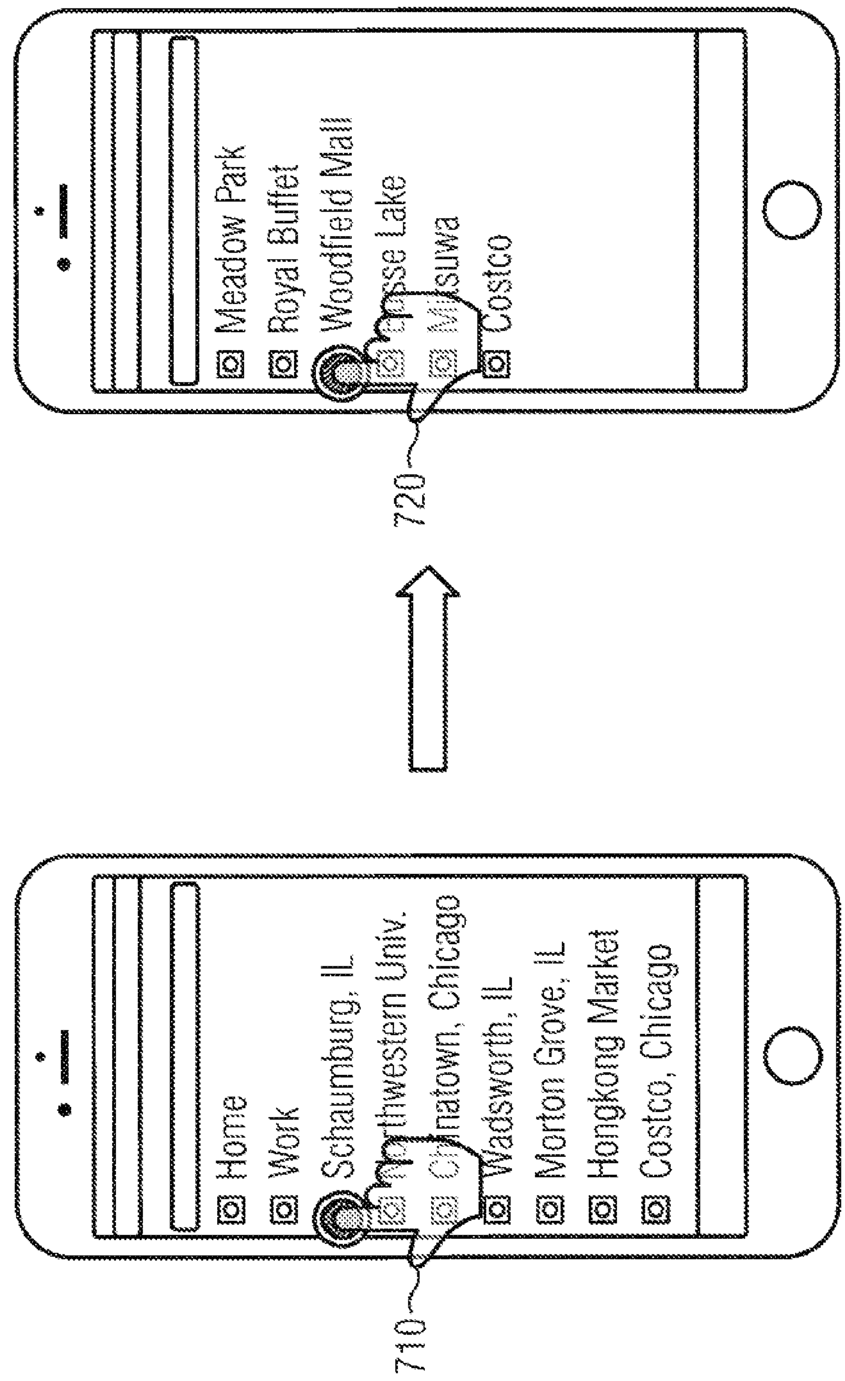
FIGS. 7, 8A and 8B illustrate exemplary displays for a plurality of potential travel destinations of a user.

As indicated above, method 200 further comprises displaying the plurality of potential travel destinations to the user in step 280. This is exemplarily illustrated in FIGS. 7, 8A and 8B. In FIG. 7, the plurality of potential travel destinations is illustrated as graphic symbols representing list items of a list.

In FIG. 7, individual graphic symbols are displayed to the user for the pairs of the plurality of potential travel destinations having a respective weighted similarity within the first range. Further, a single graphic symbol is displayed to the user for the potential travel destinations in the first cluster. Further single graphic symbols are displayed to the user for the potential travel destinations in the second and third clusters.

In the example of FIG. 7, the user's location is Chicago, Ill. Accordingly, potential travel destinations within Chicago are not clustered since their respective weighted similarities are within the first range. In the example of FIG. 7, individual graphic symbols are hence displayed for the potential travel destinations "Home," "Work," "Northwestern Univ.," "Chinatown, Chicago," "Hongkong Market" and "Costco, Chicago." Further potential travel destinations outside Chicago, Ill. are clustered and graphic symbols are only displayed for the respective clusters. In the example of FIG. 7, individual graphic symbols are hence displayed for the clusters "Schaumburg, Ill.," "Wadsworth, Ill." and "Morton Grove, Ill." It is evident from FIG. 7 that labels are assigned to the clusters based on the potential travel destinations in the clusters. Further, the potential travel destinations are ranked as described above, and displayed to the user according to the ranking. For example, the ranking of the first cluster "Schaumburg, Ill." is higher than the ranking of second cluster "Wadsworth, Ill." Accordingly, the first cluster "Schaumburg, Ill." is ranked higher than the second cluster "Wadsworth, Ill." in the list.

The example of FIG. 7, hence, uses hierarchical destination layers. As illustrated in FIG. 7, when the user is at city A, the proposed method may cluster all destinations in city B into one cluster. In order to enable the user to quickly find a specific destination in city B, the proposed method uses the hierarchic structure of the display. Due to the hierarchical destination layers, the user only needs to make one tap to expand and find the right destination.

As indicated in FIG. 7, a user input 710 that indicates a selection of the first cluster "Schaumburg, Ill." may be received (e.g., by touching a touch display). In response to the user input individual graphic symbols for the potential travel destinations in the first cluster are displayed. The user may now select one of the potential travel destinations in the first cluster via second user input 720. In the example of FIG. 7, the user may select the potential travel destinations "Woodfield Mall" in Schaumburg, Ill. via the second user input 720.

Figures 8, 8A:
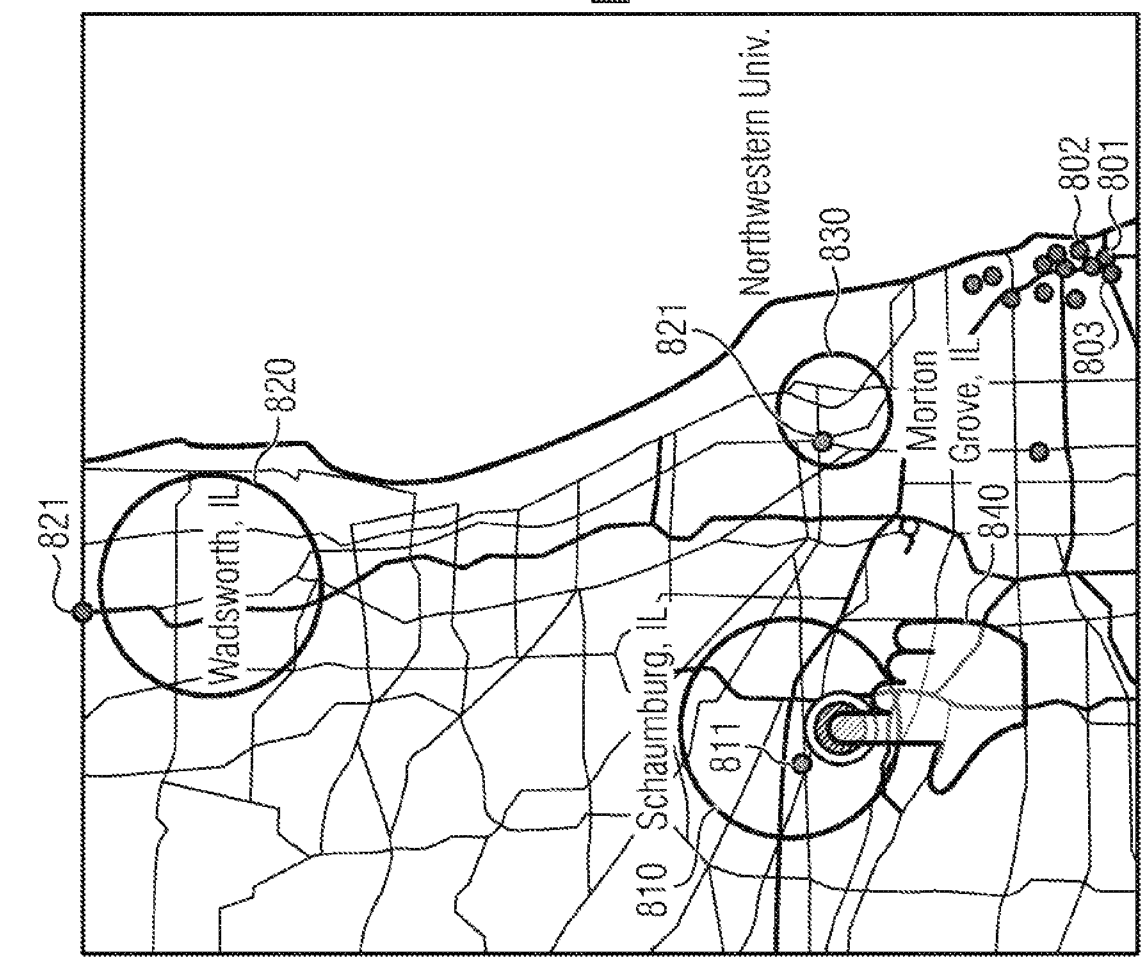
Figure 8B:
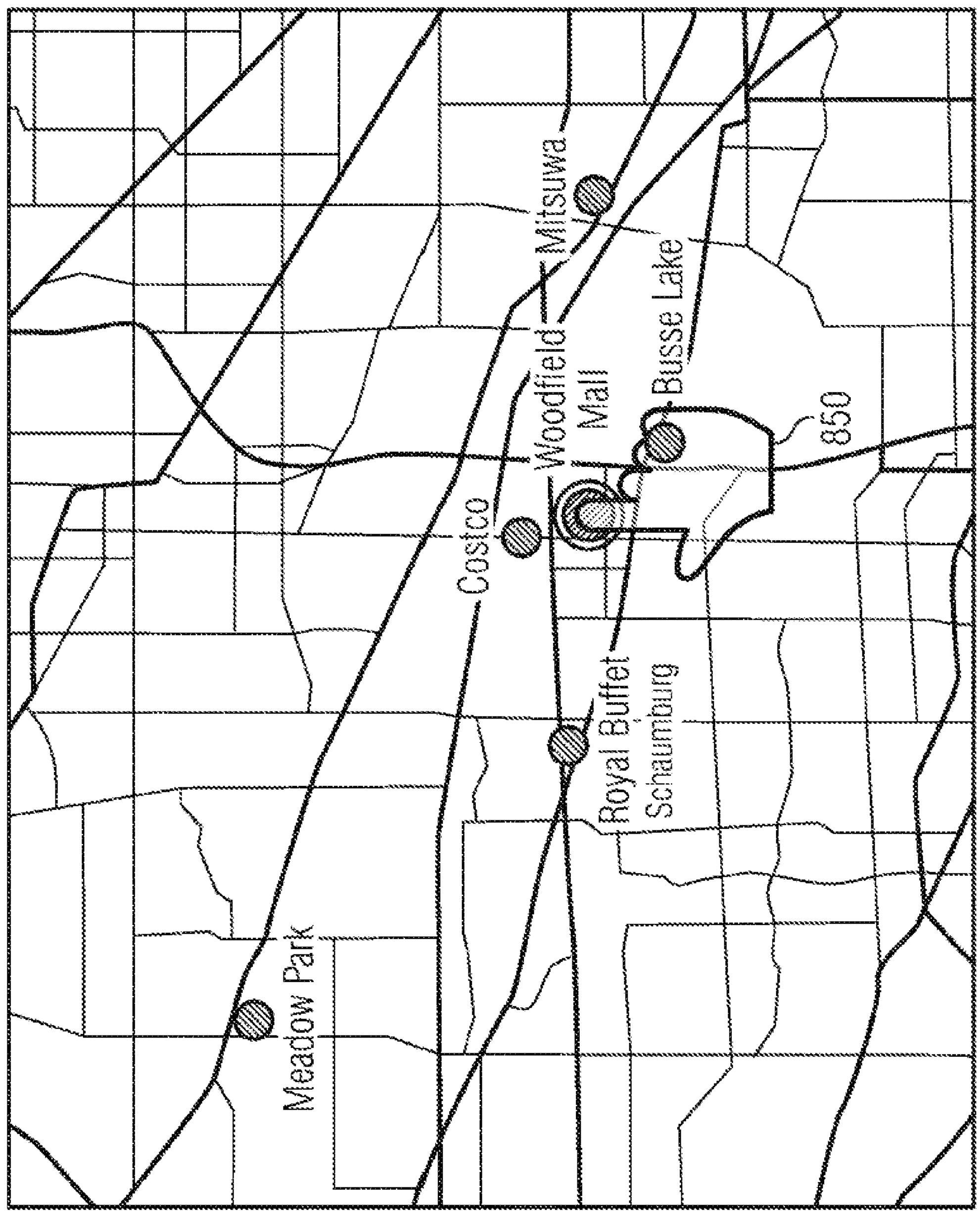

An alternative graphical representation is illustrated in FIGS. 8A and 8B. In FIGS. 8A and 8B, the graphic symbols for the potential destinations and the clusters are geometric forms in a map. Like for FIG. 7, it is again assumed that the user's location is Chicago, Ill. Accordingly, individual graphic symbols are hence displayed for the potential travel destinations within Chicago, i.e., within the proximity of the user. Potential travel destinations 811, 821, 831 in Schaumburg, Wadsworth and Morton Grove are not displayed individually since they are clustered according to the proposed concept. Accordingly, individual graphic symbols 810, 820, 830 are merely displayed for the clusters "Schaumburg, Ill.," "Wadsworth, Ill." and "Morton Grove, Ill." Again, the clusters 810, 820, 830 are ranked. The ranking is illustrated by means of varying diameters for the circles representing the clusters.

Similar to the situation illustrated in FIG. 7, a user input 840 that indicates a selection of the first cluster "Schaumburg, Ill." may be received (e.g., by touching a touch display). In response to the user input individual graphic symbols for the potential travel destinations in the first cluster are displayed (and the map is zoomed). The user may now select one of the potential travel destinations in the first cluster via second user input 850. In the example of FIG. 8B, the user may select the potential travel destinations "Woodfield Mall" in Schaumburg, Ill. via the second user input 850.

As indicated by step 290, method 200 may further comprise displaying, for at least one potential travel destination being represented by an individual graphic symbol (i.e., a potential travel destination of the pairs of the plurality of potential travel destinations having a respective similarity within the first range), information related to the one potential travel destination. Similarly, information related to first, second and/or further clusters may be displayed. This may allow providing destination management and relevant services to the user. For example, the information may be an estimated time of arrival or the weather at the potential travel destination. Regarding the clusters, if the user is, e.g., in Chicago, only the center of all destinations in Milwaukee may be retrieved and a single estimated time of arrival for the center of Milwaukee may be displayed.

The proposed concept may, hence, enable an improved user interface. The proposed concept may offer an intelligent destination management system that is able to efficiently and contextually organize user's destinations and minimize user's efforts to look up his/her destinations. The destination management system according to proposed concept does not only rely on frequency and recent destinations, but may rely also on the driver's current location and behavior that can be learned from collected driving data. It may organize the destinations contextual and personalized in order to minimize the user's efforts by offering relevant destinations only. The proposed concept may allow to manage the user's destinations and may greatly improve the user's driving experience, may minimize the user's cognitive interaction and may provide a "one-click to go" experience.

The destination management according to the proposed concept may allow elastic determination of clusters based on multiple factors like a user's historical visit frequency, a user's recent visit frequency, a user's profile and/or a user's current location. Therefore, the intelligent destination management system according to the proposed concept may allow to organize all destinations relevant and dynamic to enable users to quickly find their destination.

The intelligent destination management system according to the proposed concept may provide personal, contextual, intelligent services. It may improve a user's driving experience since the user can easily find his/her destination and just focus on the info what he/she needs. Further, the user's workload before driving may be lowered, and even more on the road. Moreover, relevant information of these destinations may be displayed without redundancy.

The proposed concept may provide a significant location modeling that learns a user's visited places from personal driving history data. A personal and contextual hierarchical destination management algorithm and system according to the proposed concept may allow modeling of the user's destinations dynamically and user-friendly based on the personalization and context. This technology may, e.g., be applied to destination prediction. In particular, a hybrid solution to model the destination in different granularity may be enabled. For example, if a user wants to drive from Chicago to O'Hare airport, a bit of precise location information is required. If the user wants to drive from Chicago to New York City, he or she can set the navigation with coarse granularity unless it is getting closer to New York City. Similar, smart management of the user's destination list may be enabled. A user's cognitive load to find a destination/place may be lowered since just the right level of information that the user needs in a given situation is provided. The proposed concept may allow providing the relevant information the user needs—no more, no less.

The proposed concept may offer a novel technical approach: The personal and contextual hierarchical destination management may use a low complexity algorithm that can automatically classify these destinations based on user's learnt destination profile and current location as context.

Further, granularity may be introduced to learnt destination: The proposed concept may provide the destination prediction flexible and elastic. For a local area, it may predict the exact location. For a far distance, it may predict the region during current context and refine the destination when the user gets closer to the destination. It may further offer the opportunity for fuzzy region prediction with reasonable confidence. Normal algorithms are designed to predict the destination with confidence. Now, for a given confidence a region (size) algorithm may be able to predict.

Also the user experience may be greatly improved: The user experience may be improved by rendering just relevant information that the user needs. It can make the search easier and reduce the cognitive load that is particularly important when time is critical during driving.

The proposed concept may further be an enabler to bring the personal, intelligent and context-awareness differentiation: It can be used for trip planning services by providing real-time traffic, incident, road condition, weather, and etc.

Figure 9:
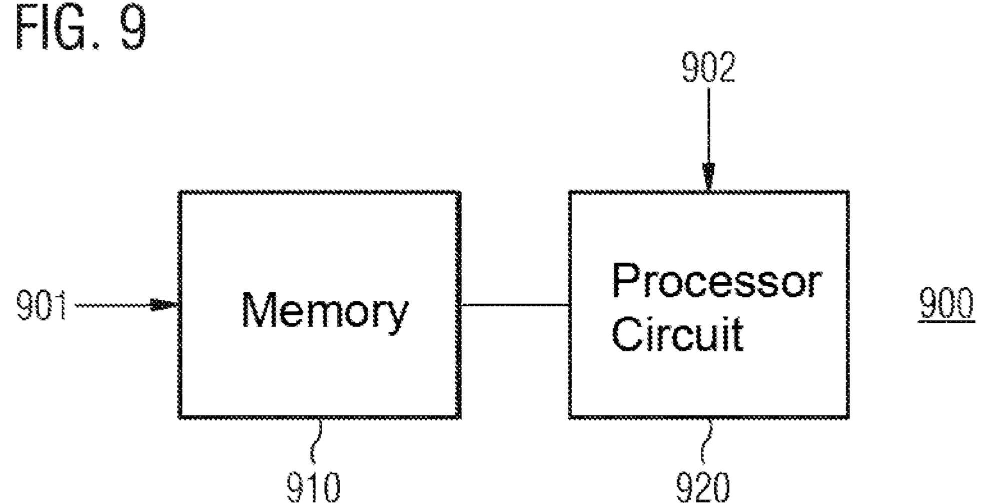
FIG. 9 illustrates an example of an apparatus for managing a plurality of potential travel destinations of a user.

An example of an implementation using a method according to one or more aspects of the proposed concept or one or more examples described above is illustrated in FIG. 9. FIG. 9 illustrates an apparatus 900 for managing a plurality of potential travel destinations 901 of a user. Apparatus 900 comprises a memory 910 configured to store the plurality of potential travel destinations 901. Further, apparatus 900 comprises a processor circuit 920 configured to determine a plurality of similarities between different pairs of the plurality of potential travel destinations 901. The processor circuit 920 is additionally configured to weight the plurality of similarities using contextual information 902 related to the user, and cluster part of the plurality of potential travel destinations 901 based on the weighted plurality of similarities.

Apparatus 900 may optionally comprise further elements like a display and/or an input device.

For example, apparatus 900 may be a mobile device (e.g., smartphone, tablet computer, laptop), a navigation system, or a vehicle. A vehicle may be any apparatus that comprises an engine and wheels (and optionally a powertrain system). For example, the vehicle may be a private vehicle or a commercial vehicle. In particular, the vehicle may be an automobile, a truck, a motorcycle, or a tractor.

As described above, apparatus 900 may allow to group the plurality of potential travel destinations in a more user-friendly manner by using the similarities between different pairs of potential travel destinations together with the user related contextual information. Accordingly, a cognitive load for finding a certain one of the plurality of potential travel destinations may be reduced. Distraction of the user may, hence, be reduced.

More details and aspects of apparatus 900 are mentioned in connection with the proposed concept or one or more examples described above (e.g., FIGS. 1 to 8B). Apparatus 900 or one of its elements (e.g., processor circuit 920, the display, the input device) may comprise or be configured to perform one or more additional optional features corresponding to one or more aspects of the proposed concept or one or more examples described above.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a non-transitory computer-readable medium storing a computer program having a program code for performing one or more of the above methods, when the computer program is executed on a computer or processor. Steps, operations or processes of various above-described methods may be performed by programmed computers or processors. Examples may also cover program storage devices such as non-transitory digital data storage media, which are machine, processor or computer readable and encode machine-executable, processor-executable or computer-executable programs of instructions. The instructions perform or cause performing some or all of the steps of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the steps of the above-described methods or (field) programmable logic arrays ((F)PLAs) or (field) programmable gate arrays ((F)PGAs), programmed to perform the steps of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

When provided by a processor, the functions may be provided by a single dedicated processor, by a single shared processor, or by a plurality of individual processors, some of which or all of which may be shared. However, the term “processor” is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in a non-transitory machine readable medium and so executed by a computer or processor, whether or not such computer or processor is explicitly shown. Methods disclosed in the specification or in the claims may be implemented by a device having means for performing each of the respective steps of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple steps or functions will not limit these to a particular order unless such steps or functions are not interchangeable for technical reasons. Furthermore, in some examples a single act, function, process, operation or step may include or may be broken into multiple sub-acts, -functions, -processes, -operations or -steps, respectively. Such sub steps may be included and part of the disclosure of this single step unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for managing a plurality of potential travel destinations of a user in a vehicle, comprising:

determining a plurality of similarities between different pairs of the plurality of potential travel destinations based on a current position of the vehicle relative to the plurality of potential destinations;

weighting the plurality of similarities using contextual information related to the user;

clustering part of the plurality of potential travel destinations based on the plurality of weighted similarities, which includes not clustering pairs of the plurality of potential travel destinations having a respective weighted similarity within a first range and clustering pairs of the plurality of potential travel destinations having a respective weighted similarity within a second range, which is larger than the first range, to a first cluster;

displaying, in the vehicle, individual graphic symbols for each of the plurality of potential travel destinations included in the pairs of the plurality of potential travel destinations having the respective weighted similarity within the first range; and displaying, in the vehicle, a single graphic symbol for all of the potential travel destinations in the first cluster.

2. The method of claim 1, further comprising:

receiving a user input that indicates a selection of the first cluster; and displaying, in response to the user input, individual graphic symbols for the potential travel destinations in the first cluster.

3. The method of claim 1, wherein the graphic symbols are list items of a list, or wherein the graphic symbols are geometric forms in a map.

4. The method of claim 1, further comprising:

displaying, for at least one potential travel destination of the pairs of the plurality of potential travel destinations having a respective weighted similarity within the first range, information related to the one potential travel destination; and displaying information related to the first cluster.

5. The method of claim 1, further comprising:

assigning a label to the first cluster based on the potential travel destinations in the first cluster.

6. The method of claim 1, further comprising:

clustering pairs of the plurality of potential travel destinations having a respective weighted similarity within a third range to a second cluster.

7. The method of claim 6, further comprising:

ranking the first cluster and the second cluster based on one or more attributes of the potential travel destinations in the first cluster and in the second cluster; and displaying, to the user, the first cluster and the second cluster according to the ranking.

8. The method of claim 1, wherein the contextual information related to the user is one of a current location of the user, and a visit frequency of the respective pair of the plurality of potential travel destinations.

9. The method of claim 1, wherein the similarity between a pair of the plurality of potential travel destinations is based on a distance between the pair of the plurality of potential travel destinations, and wherein the weighted similarity between the pair of the plurality of potential travel destinations is based on a weighting factor that depends on a current location of the user.

10. The method of claim 9, wherein the weighting factor depends on a distance of the current location of the user to a line connecting the respective pair of the plurality of potential travel destinations.

11. The method of claim 10, wherein the weighting factor is a first value when the distance of the current location of the user to the line connecting the respective pair of the plurality of potential travel destinations is smaller than a first threshold, and wherein the weighting factor is a second value when the first threshold is smaller than the distance of the current location of the user to the line connecting the respective pair of the plurality of potential travel destinations.

12. The method of claim 11, wherein the first threshold value is selected based on a ratio of an increase of the number of potential travel destinations to an increase of the distance to the current location of the user.

13. The method of claim 12, wherein the first threshold value is a maximum distance to the current location of the user for which the increase of the number of potential travel destinations is larger than a predefined value.

14. The method of claim 11, wherein the second value is variable and depends on the distance of the current location of the user to the line connecting the respective pair of the plurality of potential travel destinations.

15. The method of claim 11, wherein the weighting factor is a third value when a second threshold is smaller than the distance of the current location of the user to the line connecting the respective pair of the plurality of potential travel destinations.

16. The method of claim 1, further comprising:

determining the plurality of potential travel destinations from user generated content.

17. A non-transitory machine readable medium having stored thereon a program having a program code which, when executed by a processor, causes the processor to performing steps comprising:

determining a plurality of similarities between different pairs of the plurality of potential travel destinations based on a current position of the vehicle relative to the plurality of potential destinations;

weighting the plurality of similarities using contextual information related to the user; and clustering part of the plurality of potential travel destinations based on the plurality of weighted similarities, which includes not clustering pairs of the plurality of potential travel destinations having a respective weighted similarity within a first range and clustering pairs of the plurality of potential travel destinations having a respective weighted similarity within a second range, which is larger than the first range, to a first cluster;

displaying, in the vehicle, individual graphic symbols for each of the plurality of potential travel destinations included in the pairs of the plurality of potential travel destinations having the respective weighted similarity within the first range; and displaying, in the vehicle, a single graphic symbol for all of the potential travel destinations in the first cluster.

18. An apparatus for managing a plurality of potential travel destinations of a user, comprising:

a memory configured to store the plurality of potential travel destinations; and a processor circuit configured to:

determine a plurality of similarities between different pairs of the plurality of potential travel destinations based on a current position of the vehicle relative to the plurality of potential destinations;

weight the plurality of similarities using contextual information related to the user; and cluster part of the plurality of potential travel destinations based on the plurality of weighted similarities, which includes not clustering pairs of the plurality of potential travel destinations having a respective weighted similarity within a first range and clustering pairs of the plurality of potential travel destinations having a respective weighted similarity within a second range, which is larger than the first range, to a first cluster;

display, in the vehicle, individual graphic symbols for each of the plurality of potential travel destinations included in the pairs of the plurality of potential travel destinations having the respective weighted similarity within the first range; and display, in the vehicle, a single graphic symbol for all of the potential travel destinations in the first cluster.

* * * * *